United States Patent [19]

Porter

[11] Patent Number: 5,119,677
[45] Date of Patent: Jun. 9, 1992

[54] GAUGE PROTECTOR

[76] Inventor: Stuart J. Porter, 2181 Mill Rd., Novato, Calif. 94947

[21] Appl. No.: 596,208

[22] Filed: Oct. 11, 1990

Related U.S. Application Data

[63] Continuation-in-part of Ser. No. 529,159, May 25, 1990.

[51] Int. Cl.⁵ .............................................. G01D 11/24
[52] U.S. Cl. ................................ 73/431; 73/865.1; 359/808; 359/810
[58] Field of Search ............... 73/865.1, 431; 350/242, 350/243, 580; 359/808, 809, 810, 895

[56] References Cited

U.S. PATENT DOCUMENTS

| | | | |
|---|---|---|---|
| 3,530,723 | 9/1970 | Hogue et al. ........................ | 73/431 |
| 3,872,731 | 3/1975 | Borom et al. ....................... | 73/865.1 |
| 4,466,283 | 8/1984 | Osterhout ........................ | 73/431 X |
| 5,029,472 | 7/1991 | Falck .................................. | 73/431 |

*Primary Examiner*—Tom Noland
*Attorney, Agent, or Firm*—Larry D. Johnson

[57] ABSTRACT

A gauge protector provides a shield device for the protection of the lenses of skin diving gauges and related articles, and includes one or more crossbar elements extending between crossbar base portions, of a size and shape to fit over the gauge lens, and attaches to the outside of the dive gauge body and/or its associated flexible protective boot member. The crossbar base portions preferably include downwardly-extending peripheral flange portions for releasable capture of the sides of the gauge body and/or protective boot member, and may themselves include open portions to enable passage of a gauge hose, strap, or similar member. Alternatively, any other method of attachment to the gauge body or boot member may be used, including friction-fit, toothed grasping, strapping, mechanical connection, or the like.

6 Claims, 3 Drawing Sheets

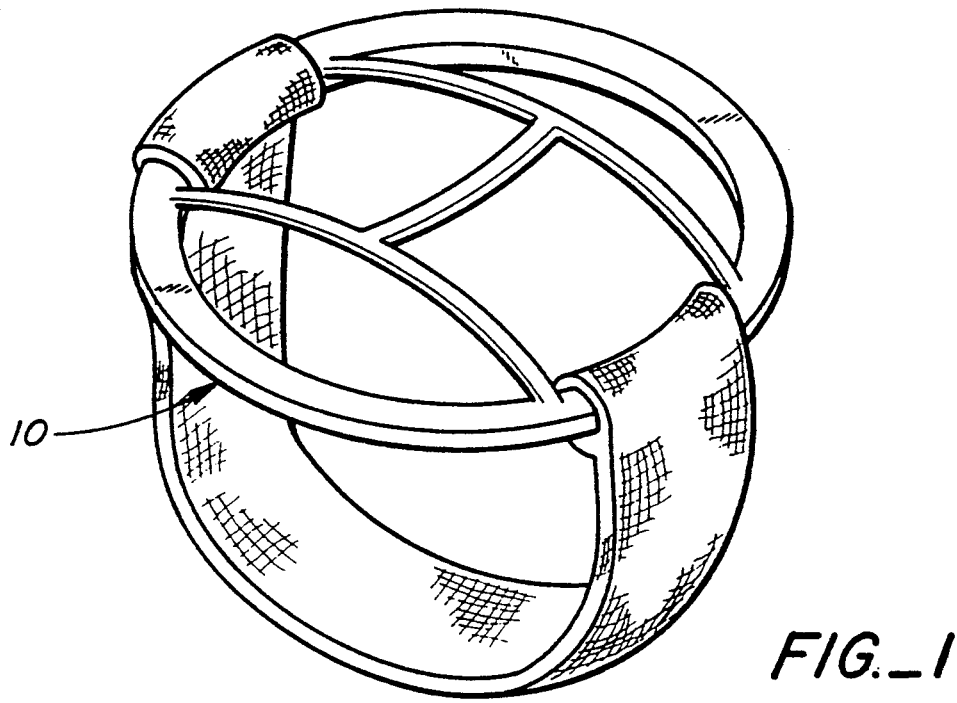
FIG._1
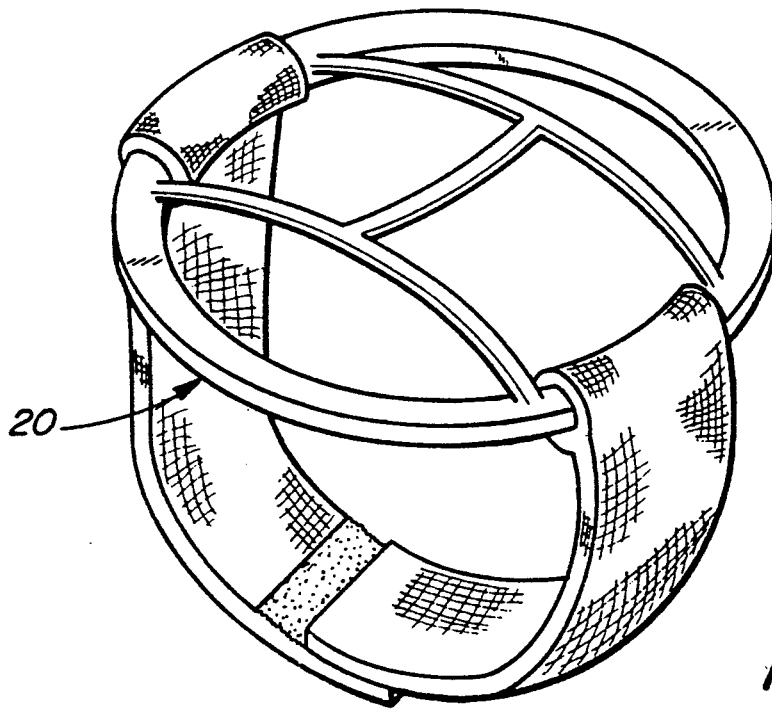
FIG._2

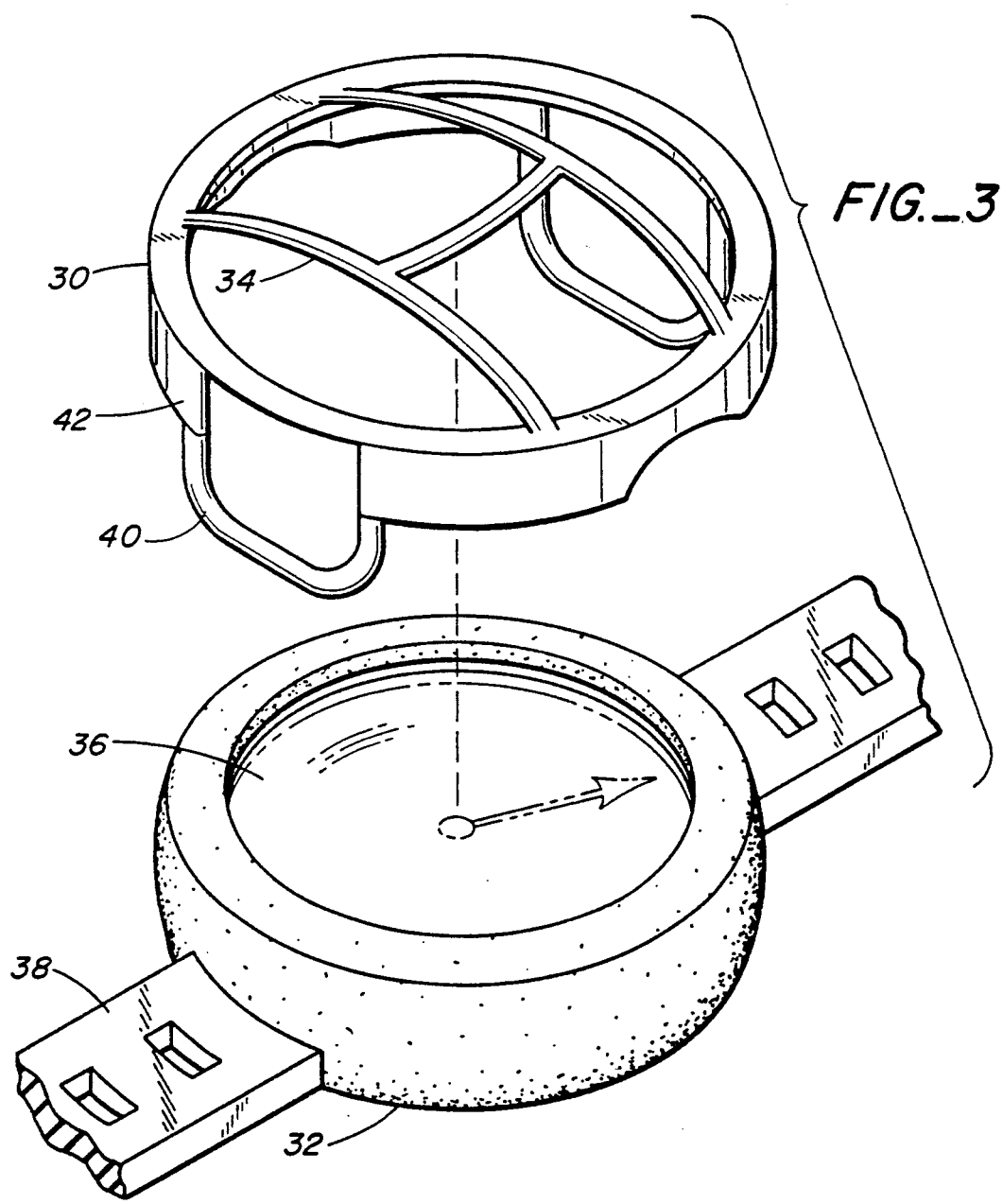
FIG._3

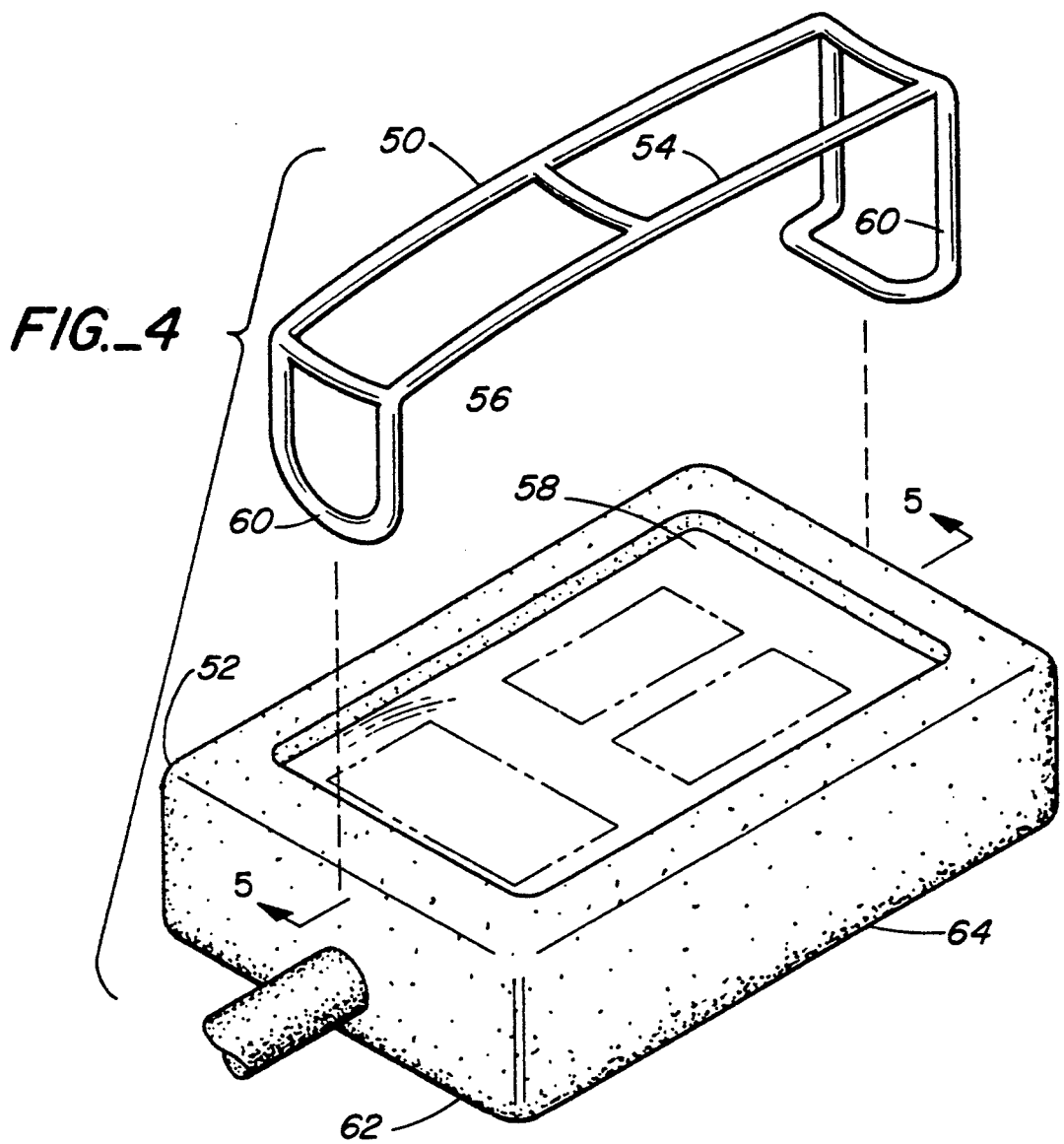
FIG._4
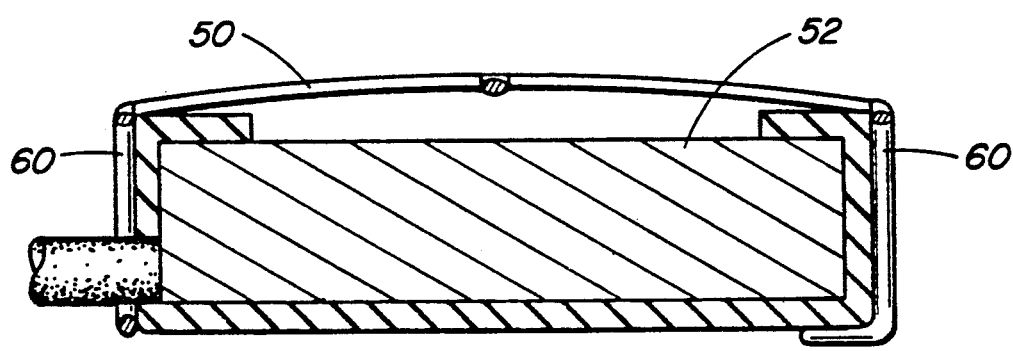
FIG._5

GAUGE PROTECTOR

BACKGROUND OF THE INVENTION

This application is a continuation-in-part of copending U.S. patent application Ser. No. 529,159, filed May 25, 1990.

1. Field of the Invention

This invention relates generally to gauges, compasses, and related articles used in skin and scuba diving, and more specifically to an improved shield device for protection of the lenses of such articles.

2. Description of the Prior Art

Dive gauges and other instruments as used in the skin and scuba diving industry are well known. Many skin and scuba divers use a variety of such gauges, including pressure gauges (used to display the air pressure remaining in the compressed air tank), depth gauges (used to display the depth below the water surface), watches (used to display time, elapsed time, and the like), compasses (used to display magnetic north and associated bearings), and dive "computers" (which are programmable and used to display diving criteria such as decompression levels, times, and the like).

Most such dive gauges include a gauge body having a dial covered by a transparent lens or window, and may include a hose connecting the gauge body to some other component of the diving equipment (e.g., a pressure gauge is so connected to the compressed air tank to monitor remaining pressure). The gauge body is typically removably encased in a soft rubber or neoprene boot for protection, while leaving the lens uncovered for viewing by the diver. Unfortunately, the lens is therefore exposed and prone to scratching, etching, and other forms of abrasion, which obscures the transparency of the lens and thus reduces the ability of the diver to view the gauge dial. Although many such lenses are designed to be replaceable to remedy this problem, such replacement can be awkward, time-consuming and expensive.

SUMMARY OF THE INVENTION

The gauge protector of this invention provides a shield device for the protection of the lenses of skin diving gauges and related articles. The device comprises one or more crossbar elements extending between crossbar base portions, of a size and shape to fit over the gauge lens, and attaches to the outside of the dive gauge body and/or its associated flexible protective boot member. The crossbar base portions preferably include downwardly-extending peripheral flange portions for releasable capture of the sides of the gauge body and/or protective boot member, and may themselves include open portions to enable passage of a gauge hose, strap, or similar member. Alternatively, any other method of attachment to the gauge body or boot member may be used, including friction-fit, toothed grasping, strapping, mechanical connection, or the like.

BRIEF DESCRIPTION OF THE DRAWINGS

FIG. 1 is a perspective view of an elastic strap embodiment of the gauge protector of this invention;

FIG. 2 is a perspective view of and adjustable strap embodiment of the gauge protector of this invention;

FIG. 3 is a perspective view of a side registration and threading bales embodiment of a gauge protector of this invention in position to be installed over the lens of a typical dive compass, so that the crossbar elements of the gauge protector shield the compass lens from contact and abrasion, and the compass body strap is inserted through the bales of the gauge protector peripheral flange portions;

FIG. 4 is an exploded perspective view of a wrap-around grip embodiment of the gauge protector of this invention, illustrating the placement of the gauge protector over the dive gauge body so that the gauge protector crossbar elements extend between the crossbar base portions to shield the dive gauge lens, and the gauge protector peripheral flange portions releasably capture the sides and/or bottom of the dive gauge body; and FIG. 5 is a side elevation cross-sectional view of the gauge protector and dive gauge of FIG. 4, this view taken along line 5—5 of FIG. 4, and illustrating the capture of the sides of the dive gauge body by the gauge protector peripheral flange portions.

DETAILED DESCRIPTION OF A PREFERRED EMBODIMENT

FIG. 1 is a perspective view of an elastic strap embodiment 10 of the gauge protector of this invention.

FIG. 2 is a perspective view of and adjustable strap embodiment 20 of the gauge protector of this invention.

FIG. 3 is a perspective view of a side registration and threading bales embodiment 30 of a gauge protector of this invention in position to be installed over the lens of a typical dive compass 32, so that the crossbar elements 34 of the gauge protector shield the compass lens 36 from contact and abrasion, and the compass body strap 38 is inserted through the bales 40 of the gauge protector peripheral flange portions 42.

FIG. 4 is an exploded perspective view of a wrap-around grip embodiment 50 of the gauge protector of this invention, illustrating the placement of the gauge protector over the dive gauge body 52 so that the gauge protector crossbar elements 54 extend between the crossbar base portions 56 to shield the dive gauge lens 58, and the gauge protector peripheral flange portions 60 releasably capture the sides 62 and/or bottom 64 of the dive gauge body.

FIG. 5 is side elevation cross-sectional view of the gauge protector 50 and dive gauge 52 of FIG. 4, this view taken along line 5—5 of FIG. 4, and illustrating the capture of the sides of the dive gauge body 52 by the gauge protector peripheral flange portions 60.

The gauge protector of this invention is preferably made of stainless steel or similar strong, non-corrosive material, which is preferably non-magnetic so as not to interfere with a compass (where appropriate). The gauge protector can of course be made in any size or shape to accomodate any specific gauge body.

While this invention has been described in connection with preferred embodiments thereof, it is obvious that modifications and changes therein ma be made by those skilled in the art to which it pertains without departing from the spirit and scope of the invention. Accordingly, the scope of this invention is to be limited only by the appended claims.

What is claimed as invention is:

1. A diving gauge lens protector to shield the transparent lens of a diving gauge having a gauge body bearing gauge body sides, said diving gauge lens protector comprising:

one or more cross bar elements of a size to extend across said diving gauge lens, said crossbar elements terminating in crossbar base portions on opposite sides of said diving gauge lens, said crossbar base portions including downwardly-extending peripheral flange portions, said peripheral flange portions conditioned for releasable capture of said gauge body sides.

2. The diving gauge lens protector of claim 1 wherein at least one of said downwardly-extending peripheral flange portions includes a notch portion to enable passage of a hose member.

3. The diving gauge lens protector of claim 1 wherein said downwardly-extending peripheral flange portions are generally straight.

4. The diving gauge lens protector of claim 1 wherein said downwardly-extending peripheral flange portions are generally curved.

5. The diving gauge lens protector of claim 1 wherein said downwardly-extending peripheral flange portions further include medially-extending tab portions conditioned for further capture of said gauge body.

6. The diving gauge lens protector of claim 1 wherein said crossbar elements comprise a pair of lateral crossmembers connected by a single joining crossmember.

* * * * *